United States Patent
Ralston et al.

(10) Patent No.: US 9,066,223 B2
(45) Date of Patent: Jun. 23, 2015

(54) METHODS AND SYSTEMS FOR ALGORITHMICALLY BALANCING COST AND PERFORMANCE OF CELLULAR DATA CONNECTIONS IN MULTIPURPOSE COMMUNICATIONS GATEWAYS

(71) Applicant: Feeney Wireless, LLC, Eugene, OR (US)

(72) Inventors: Robert E. Ralston, Eugene, OR (US); Justin D. Bloom, Eugene, OR (US)

(73) Assignee: Feeney Wireless, LLC, Eugene, OR (US)

( * ) Notice: Subject to any disclaimer, the term of this patent is extended or adjusted under 35 U.S.C. 154(b) by 65 days.

(21) Appl. No.: 13/966,210

(22) Filed: Aug. 13, 2013

(65) Prior Publication Data
US 2014/0057595 A1 Feb. 27, 2014

Related U.S. Application Data

(60) Provisional application No. 61/693,753, filed on Aug. 27, 2012.

(51) Int. Cl.
*H04W 4/00* (2009.01)
*H04W 36/00* (2009.01)
(Continued)

(52) U.S. Cl.
CPC ............ *H04W 4/26* (2013.01); *H04M 15/8044* (2013.01); *H04M 15/8055* (2013.01);
(Continued)

(58) Field of Classification Search
CPC ............ H04L 12/145; H04L 12/2856; H04M 15/8044; H04M 15/8055; H04M 15/8061; H04M 15/8214; H04M 15/88; H04M 15/886; H04M 15/887; H04M 15/888; H04M 15/90; H04W 4/26
USPC .................. 455/436, 406; 370/331, 328, 329
See application file for complete search history.

(56) References Cited

U.S. PATENT DOCUMENTS

2004/0203459 A1  10/2004  Borras-Chia et al.
2006/0276190 A1* 12/2006  Shaheen ........................ 455/436
(Continued)

FOREIGN PATENT DOCUMENTS

KR  1020080068677  7/2008
WO  2010128391 A  11/2010

OTHER PUBLICATIONS

International Search Report and Written Opinion; PCT/US13/56148; Nov. 28, 2013.

Primary Examiner — Opiribo Georgewill
(74) Attorney, Agent, or Firm — TechLaw LLP

(57) ABSTRACT

Embodiments of the invention provide methods and systems for algorithmically balancing cost and performance of cellular data connections in multipurpose communications gateways and other cellular enabled devices. A preferred mode of operation is determined. The preferred mode of operation can be selected from a plurality of modes of operation, each one being-sensitive to cost, coverage, or bandwidth considerations, or any combination thereof. Balancing logic receives information from a multipurpose communications gateway or other cellular device and algorithmically balances cost and performance considerations based on the preferred mode of operation and the received information. The balancing logic can cause the communications gateway or other cellular device to automatically switch telecommunications carriers, plans, and/or cellular networks to achieve enhanced performance and reduced costs.

19 Claims, 12 Drawing Sheets

(51) Int. Cl.

| | | |
|---|---|---|
| *H04M 11/00* | (2006.01) | |
| *H04W 4/26* | (2009.01) | |
| *H04M 15/00* | (2006.01) | |
| *H04L 12/14* | (2006.01) | |
| *H04L 12/28* | (2006.01) | |

(52) U.S. Cl.
CPC ...... *H04M15/8061* (2013.01); *H04M 15/8214* (2013.01); *H04M 15/88* (2013.01); *H04M 15/886* (2013.01); *H04M 15/887* (2013.01); *H04M 15/888* (2013.01); *H04M 15/90* (2013.01); *H04L 12/145* (2013.01); *H04L 12/2856* (2013.01)

(56) References Cited

U.S. PATENT DOCUMENTS

| | | |
|---|---|---|
| 2010/0150102 A1* | 6/2010 | Li et al. .................. 370/331 |
| 2012/0172023 A1 | 7/2012 | Griff et al. |
| 2012/0184242 A1 | 7/2012 | Li et al. |

* cited by examiner

METHODS AND SYSTEMS FOR ALGORITHMICALLY BALANCING COST AND PERFORMANCE OF CELLULAR DATA CONNECTIONS IN MULTIPURPOSE COMMUNICATIONS GATEWAYS

CROSS-REFERENCES TO RELATED APPLICATIONS

This application claims the benefit of commonly assigned U.S. Provisional Application No. 61/693,753 filed Aug. 27, 2012, which is hereby incorporated by reference in its entirety.

FIELD OF THE INVENTION

This application pertains to communication devices, and more particularly, to algorithmically balancing cost and performance of cellular data connections in multipurpose communications gateways.

BACKGROUND

Communications gateways use cellular data networks. The communications gateways incorporate cellular data modules, which are typically used to provide data connectivity in both fixed and mobile customer applications. Such communications gateways can provide one or many data interfaces. A new industry term for the typical application scenarios where such gateways are used is M2M (Machine-to-Machine), or more colloquially, "The Internet of Things."

Recent advances in available data throughput (i.e., bandwidth) on modern cellular networks, such as "4G" LTE (long term evolution) and WiMax networks, have enabled the deployment of more data intensive applications and usage scenarios. In many cases such applications can only perform optimally when the communications gateway is connected to the highest performance cellular data network type available to it at a given location. As a result, this has exposed issues in the algorithms and methodologies used to facilitate handover between cellular data network types. This can result in situations where a communications gateway or cellular data module can be effectively locked to using a slower network than what might otherwise be available because algorithms to facilitate the transitions between 2G, 3G, and 4G networks are unable to cope with the data usage patterns typical in customer application scenarios.

Conventional techniques do not account for the variability in the type of connectivity and related performance needed for efficient and cost-effective operation of the communications gateway. Cost can be affected by amount of data consumed, when it is consumed, and the network type used. Access costs vary among different carriers. Data usage overage fees can result in significant additional monthly expense, particularly when data usage of a given application cannot be well modeled or controlled. Manual control is cumbersome and often implemented by users too late to be effective in controlling costs.

Accordingly, a need remains for improved methods and systems for algorithmically balancing cost and performance of cellular data connections in multipurpose communications gateways and other cellular enabled devices. Embodiments of the invention address these and other limitations in the prior art.

Figure 1:
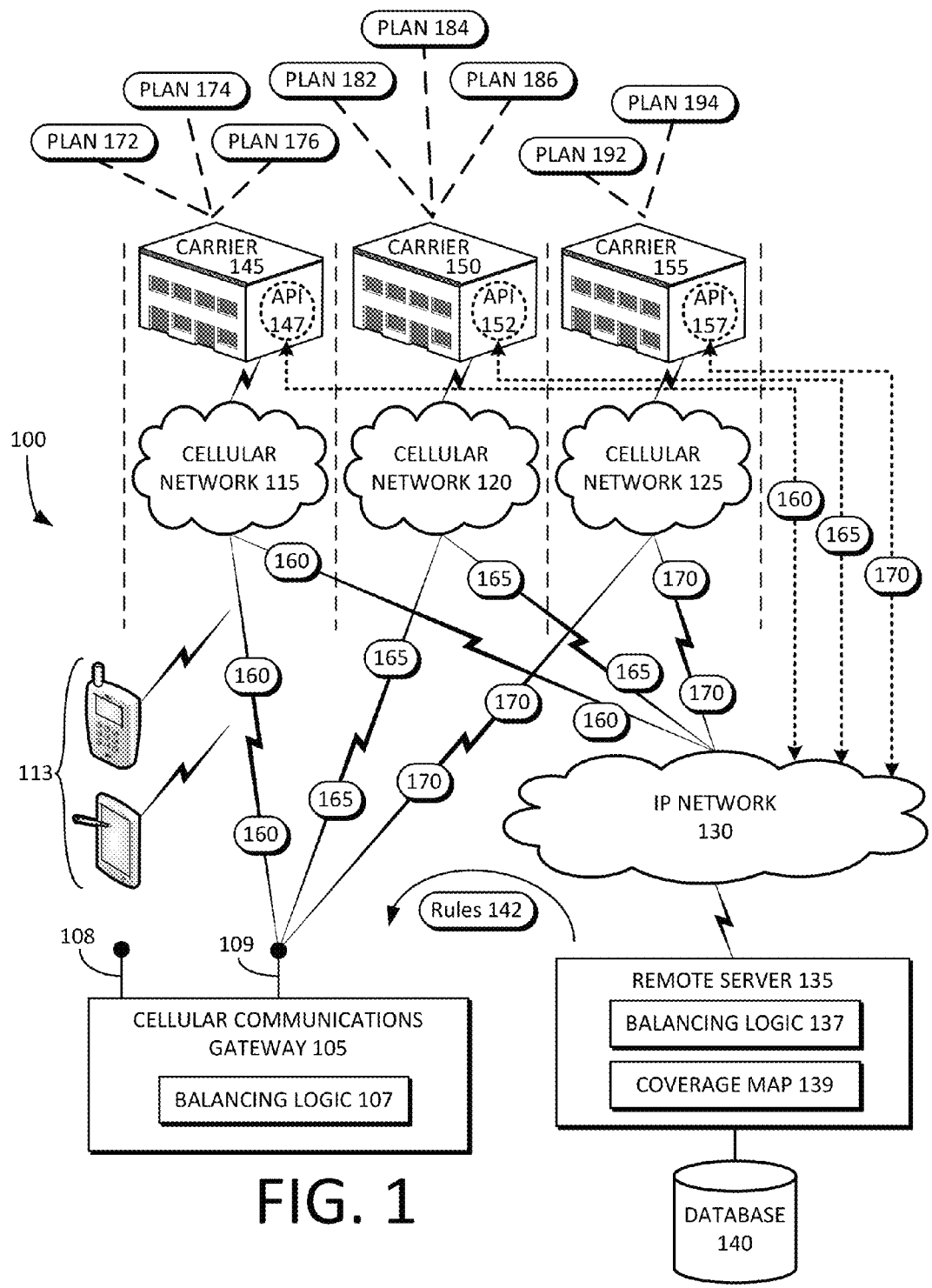
FIG. 1 illustrates a schematic diagram of an example system for balancing cost and performance of cellular data connections in multipurpose communications gateways and/or mobile cellular devices in accordance with various inventive concepts.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cellular network could be termed a second cellular network, and, similarly, a second cellular network could be termed a first cellular network, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention provide algorithms and methodology used to facilitate transitions between cellular data networks, which can be used to optimize such transitions via the use of external or remote servers (referred to herein as a "remote server"), databases, and/or GPS (global positioning system) data (or similar location data) detailing location information of a communications gateway and/or mobile cellular devices. The term "cellular communications gateway" is used herein to refer to a device or system that is configured to transmit or receive one or more cellular signals and/or one or more short-range signals. In addition to the cellular communications gateway, it will be understood that a mobile cellular device such as a phone, tablet, mobile computer, or any suitable mobile computing device, can implement or include the inventive features described herein. The term "mobile cellular device" when used herein includes a cellular communications gateway, a cellular enabled phone, a cellular enabled tablet, a cellular enabled mobile computer, other mobile computing device, or the like.

A "carrier" means a telecommunications carrier or provider. For example, a telecommunications carrier may be AT&T®, Sprint®, Verizon®, or the like.

A "cellular network" means a radio network distributed over geographic areas called cells, each area served by a cellular transceiver, sometimes referred to as a cell site or base station.

A "network service type" is a particular kind of protocol, standard, or type of network. For example, network service types can include code division multiple access (CDMA), single-carrier radio transmission technology (1xRTT), enhanced voice-data optimized (EVDO), global system for mobile communications (GSM), general packet radio service (GPRS), enhanced data rates for GSM evolution (EDGE), universal mobile telecommunications system (UMTS), high-speed downlink packet access (HSDPA), high-speed uplink packet access (HSUPA), high-speed packet access (HSPA), evolved high-speed packet access (HSPA+), long-term evolution (LTE), and worldwide interoperability for microwave access (WiMAX), among others.

A "plan" means a telecommunications carrier plan, which may include one or more features such as cost, coverage, bandwidth, voice minutes, data allowances, voicemail, and the like.

A telecommunications carrier can operate one or more cellular networks, each cellular network capable of supporting one or more network service types, such as those enumerated above. The term "cellular network" as used herein can refer to one or more cellular networks operated by a carrier. Using industry parlance, sometimes the term "cellular network" or "network" can refer to the network service type, rather than the physical cellular network itself. It will be understood that as used herein, the term "cellular network" or "network" can refer to either the physical cellular network owned and/or operated by a carrier, or a particular network service type, or any combination thereof.

The mobile cellular device can collect and periodically transmit cellular network service type, signal strength, and location data to one or more remote servers for storage in a database. The one or more remote servers can receive a query from the mobile cellular device to determine the types of network services available to the mobile cellular device at a particular location. The mobile cellular device can then be programmed to intelligently transition to a faster, higher coverage, and/or more cost effective data network connection based upon balancing logic and associated algorithms, as described in further detail below. In addition, a spot price for cellular network access, measured by minutes of time or units of data, can be broadcast or otherwise transmitted from one or more cellular network carriers to a remote server and/or the mobile cellular device. Intelligent logic embedded in the remote server and/or the mobile cellular device can use the spot price information to determine the most efficient and cost-effective configuration, including which network service type and specific carrier to connect to, as also further described below.

The remote server's database can be dynamically updated with data collected by the cellular enabled mobile device (e.g., communications gateways, phones, tablets, and the like) and/or with data obtained via the cellular network providers or carriers themselves. The rate plans and/or mobile cellular device configurations can be dynamically and automatically changed based upon certain algorithms for balancing performance and cost customized for specific applications. Such algorithms can be implemented using a server, which receives traffic and bandwidth usage information, for example, from a cellular data enabled device, such as a communications gateway or cellular phone. The server can also receive usage information pertaining to application programming interfaces (APIs) and/or data feeds from the carriers themselves, which provide visibility and control of rate plans. The server can include balancing logic, which can include or otherwise be implanted by software, firmware, hardware, or any combination thereof, to execute balancing algorithms for balancing between highest performance and lowest cost for a given application, as further described below.

The balancing logic and associated algorithms can cause device data usage to be automatically adjusted for off peak times. Moreover, the balancing logic and associated algorithms can cause a mobile cellular device to automatically select a slower data network service type when bandwidth demands allow for a reduction of costs. In addition, the balancing logic and associated algorithms can cause a mobile cellular device to automatically move between carriers based upon a lowest rate plan. The balancing logic and associated algorithms can also automatically disable device data access capabilities to prevent exceeding usage or cost thresholds.

Further, the mobile cellular device can include one or more controllable or software defined radio modules. In one embodiment, the mobile cellular device includes a single controllable or software defined radio module, which can be instructed or otherwise controlled to move between cellular network carriers. In another embodiment, the mobile cellular device includes multiple cellular modules, with each cellular module being associated with a cellular network and/or carrier. In yet another embodiment, where the mobile cellular device includes multiple controllable cellular modules, a single cellular module from among the multiple cellular modules is used to move between two or more cellular networks and/or carriers.

The embodiments described herein thus facilitate optimal usage of multiple data networks from one or more mobile cellular devices.

FIG. 1 illustrates a block diagram of an example system 100 for balancing cost and performance of cellular data connections in multipurpose communications gateways and/or mobile cellular devices in accordance with various inventive concepts of the present invention.

A multipurpose cellular communications gateway 105 can include a cellular antenna 109, a GPS antenna 108, and balancing logic 107. The balancing logic 107 can be implemented by software, firmware, hardware, or any combination thereof. The communication gateway 105 can access multiple cellular networks (e.g., 115, 120, and/or 125) via one or more cellular antennas 109. The communications gateway 105 can receive location coordinates via one or more GPS antennas 108. The communication gateway 105 can transmit traffic information, signal strength information, signal quality information, network type information, network reliability (i.e., packet loss) information, network service type information, location coordinates (i.e., received via the antenna 108), and/or bandwidth usage information to remote server 135 via one or more of the cellular networks (e.g., 115, 120, and 125) and/or via the IP network 130.

Moreover, mobile cellular devices 113, which may include a smart phone, tablet, laptop computer, and the like, can include balancing logic, such as the balancing logic 107 of the cellular communications gateway 105. The mobile cellular devices 113 may also include one or more cellular antennas and/or one or more GPS antennas. The mobile devices 113 can transmit traffic information, signal strength information, signal quality information, network type information, network reliability (i.e., packet loss) information, network service type information, location coordinates (i.e., received via the GPS antenna), and/or bandwidth usage information to remote server 135 via one or more of the cellular networks (e.g., 115, 120, and 125) and/or via the IP network 130.

The remote server 135 can include balancing logic 137, which is separate from the balancing logic 107 located on the cellular communications gateway 105 and the mobile devices 113. The remote server 135 can receive the traffic information, signal strength information, signal quality information, network type information, network reliability (i.e., packet loss) information, network service type information, location coordinates, and/or bandwidth usage information, and the balancing logic 137 can execute balancing algorithms for balancing between highest performance and/or lowest cost networks and/or carriers (e.g., carriers 145, 150, and/or 155) based on the received information. The traffic, signal strength, signal quality, network type, network reliability (i.e., packet loss), network service type, location coordinates, bandwidth, and other information received from the cellular communications gateway 105 and the mobile devices 113, can be stored in a database 140 for later access.

Moreover, the remote server 135 can access information directly from the carriers via APIs, which the carriers may expose to trusted partners. The traffic, signal strength, signal quality, network type, network reliability (i.e., packet loss), location coordinates, bandwidth, and other information accessed from the carrier, can be accessed via the APIs and/or stored in the database 140 for later access.

Each carrier may have associated therewith one or more carrier plans. For example, carrier 145 may have data plans 172, 174, and 176. Carrier 150 may have data plans 182, 184, and 186. And carrier 155 may have data plans 192 and 194. The telecommunications carrier plans can vary by cost, coverage, bandwidth, minutes, feature sets, and the like. The remote server 135 can have visibility of the different telecommunications carrier plans from multiple carriers, either pre-programmed, or accessed automatically through the carrier APIs. For example, the remote server 135 may make API calls to the carrier 145 using API 147 over the IP network 130. Similarly, the remote server 135 may make API calls to the carrier 150 using API 152. The remote server 135 may also make API calls to the carrier 155 using API 157, and so forth, for any suitable number of carriers.

In accordance with embodiments of the present invention, the carriers may broadcast or "push" spot prices (e.g., 160, 165, and 170) for cellular network access. The spot price may be a monetary unit per unit of data (e.g., $/kilobyte or $/megabyte), a monetary unit per minute of usage (e.g., $/minute), a monetary unit per second of usage (e.g., $/second), a monetary unit per hour of usage (e.g., $/hour), and so forth. The spot prices correspond to the current price the carrier is offering for access to their network. The spot price can change periodically or continually. Each carrier can have a unique spot price depending on the economics of operating the associated cellular network (115, 120, and 125), the time of day (e.g., off-peak times in the early morning may have a lower spot price than peak times during the day, and so forth), the technology being used by the carriers, the market penetration by the carriers, the economies of scale, and so forth.

The spot prices (e.g., 160, 165, and 170) may be pushed, by the various carriers (e.g., 145, 150, and 155), to the remote server 135 via the APIs and/or via the IP network 130. Similarly, the spot prices may be pushed to the cellular communications gateway 105 and/or the mobile cellular devices 113 over a corresponding cellular network (e.g., 115, 120, and 125).

The spot prices (e.g., 160, 165, and 170) may also be "pulled" from the carriers (e.g., 145, 150, and 155). For example, the remote server 135 may periodically request or pull spot prices from the various carriers, and receive those over the IP network. Similarly, the cellular communications gateway 105 and/or the mobile cellular devices 113 can periodically request or pull the spot prices from the various carriers over the corresponding cellular networks.

In accordance with embodiments of the present invention, the remote server 135 can determine a mode in which the communications gateway 105 and/or mobile cellular devices 113 should operate. In some embodiments, a preferred mode is designated by a network operator or requested by a customer. In other embodiments, the mode is automatically selected and applied by the remote server 135. After the mode is determined or applied, the balancing logic 137 of the remote server 135 can balance cost considerations, coverage considerations, and/or bandwidth considerations based on the selected mode. The balancing determinations can be made based on considerations of bandwidth, network coverage, spot prices, access cost, and/or location of the cellular communications gateway 105 or other cellular device 113.

After the balancing determinations are made based on the selected mode, the remote server 135 can transmit a command to the cellular communications gateway 105 (or other cellular devices 113) to instruct it to switch from one carrier to another, to switch from one cellular network to another, to switch from one telecommunications carrier plan to another telecommunications carrier plan, and/or to disable the cellular communications gateway 105 or other cellular devices 113 to prevent exceeding usage thresholds, thereby advantageously balancing cost and performance.

Alternatively, the balancing logic 107 of the communications gateway device 105 or the mobile devices 113 themselves can access information from the carriers via APIs (such as spot prices, network type, network service type, network reliability (i.e., packet loss), bandwidth, etc.), and/or can also use the information it already has such as traffic information, signal strength information, signal quality information, network type information, network service type, network reliability (i.e., packet loss) information, bandwidth usage information, and location coordinates, to determine the most advantageous balancing algorithm based on the selected mode of operation. The balancing logic 107 can then cause the communications gateway device 105 (or mobile cellular devices 113) to switch from one carrier to another, to switch from one cellular network to another, to switch from one telecommunications carrier plan to another telecommunications carrier plan, and/or to disable the cellular communications gateway 105 or other cellular devices 113 to prevent exceeding usage thresholds, thereby advantageously balancing cost and performance.

Alternatively, or in addition, the balancing logic 137 of the remote server 135 may produce rules 142 and periodically transmit the rules to the communications gateway 105 and/or the mobile devices 113. The rules 142 provide guidelines or instructions to the communications gateway 105 pertaining to, for example, whether and when to switch from one carrier to another, whether and when to switch from one cellular network to another, and/or whether and when to switch from one telecommunications carrier plan to another.

The rules 142 can be produced based on information received from the communications gateway 105 and/or the mobile devices 113. For example, if the remote server 135 receives information that the communications gateway or mobile devices are in a particular region or town, for example, it may send rules 142 to the communications gateway or mobile devices specific to the available coverage options, available cellular networks, and/or available telecommunications carrier plans relative to that particular region or town.

The balancing logic 107 can make decisions based on the rules 142 independent of remote server 135 during at least the periods between receiving the rules 142. In other words, the communications gateway 105 (or individual mobile devices 113) can act more autonomously because the remote server 135 need not send real time commands to maintain the desired balancing. In this manner, a reduction in the frequency of communications between the communications gateway 105 and the remote server 135 is achieved. If the communications gateway 105 is transferred or is moved to a different region or town, the remote server 135 can send new rules 142 specific to the new region or town, thereby maintaining accuracy in the application of the rules 142 to particular geographic regions.

The remote server 135 can also build or maintain a dynamic coverage map 139. The dynamic coverage map 139 can track signal strength, signal quality, network type, network service type, network reliability (i.e., packet loss), bandwidth usage, and the like, of individual cellular enabled devices relative to their individual location coordinates. The dynamic coverage map 139 can be combined with other information received from the communications gateways or other cellular enabled devices, with information received from the carriers, and/or with other analytics information, so that the balancing logic 137 can more effectively balance and automate between the various cost and performance factors to achieve an optimal configuration. Such information can be mapped, displayed, and analyzed.

The remote server 135 can maintain and manage pools of devices and/or telecommunications carrier plans from among one or more carriers. Such pooling can be used to automatically allocate the lowest cost or highest performing networks or plans based on the balancing algorithms. For example, the balancing logic can select a plan from among the pool of plans according to predefined criteria, such as the lowest cost and/or highest performing plan from among the pool of plans, and cause a rule or instruction to be transmitted to the mobile cellular devices to obtain cellular access through the selected plan. In this manner, customer costs are decreased. By way of another example, the remote server 135 can detect when a particular mobile cellular device is nearing the end of a billing cycle, and automatically make adjustments near the end of a billing cycle to the mobile cellular device so that it ceases accessing the cellular network. For example, an instruction can be transmitted from the remote server to the mobile cellular device to temporarily disable access to any cellular network for a predefined period of time, for example, until the beginning of the next billing cycle. The end of a billing cycle is a vulnerable time to the user because of possible minutes overages or data limit overages. In this manner, excess charges can be avoided or even eliminated.

Figure 2:
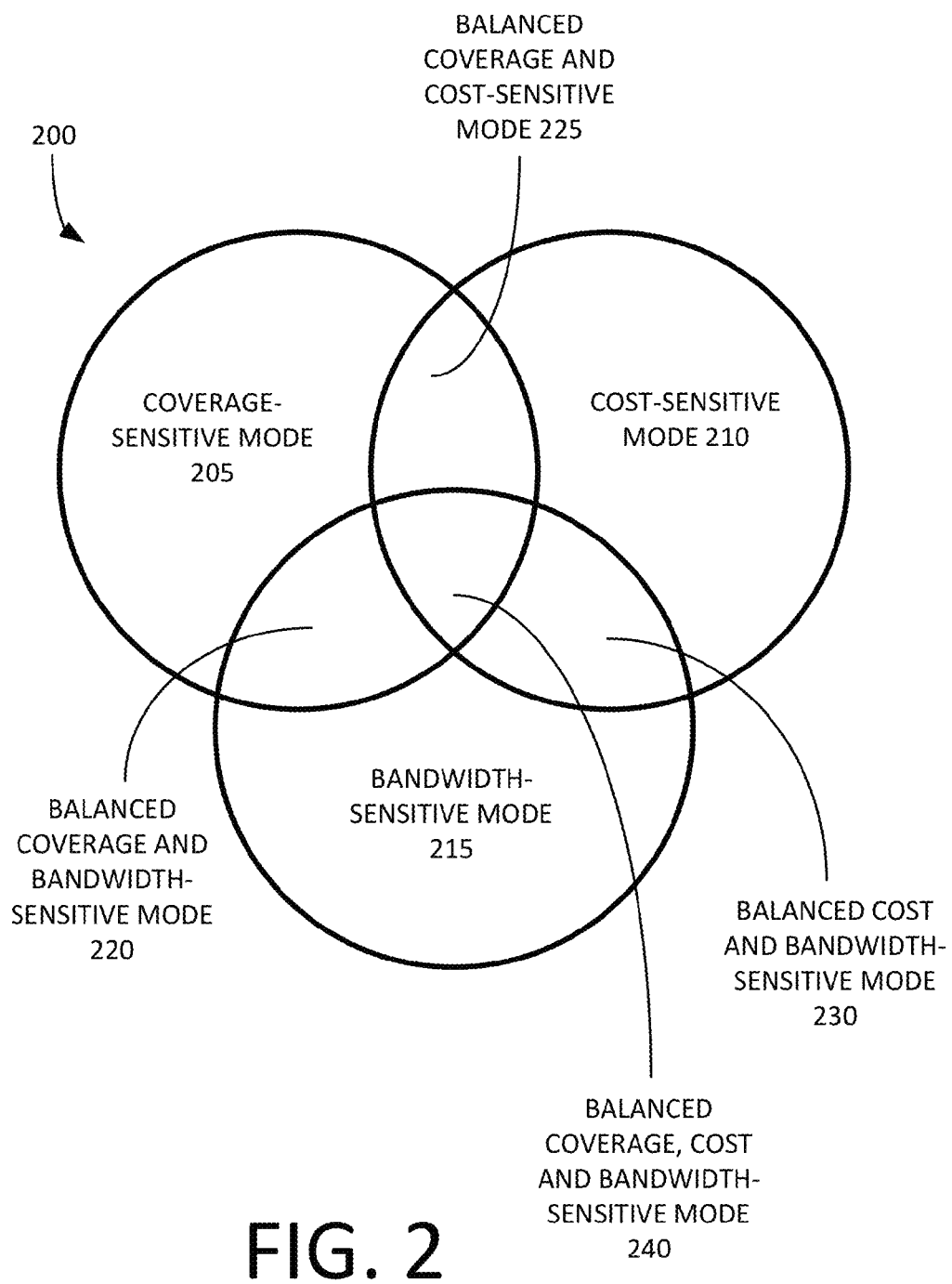
FIG. 2 illustrates a diagram of different operating modes of the multipurpose communications gateway and/or mobile cellular devices of FIG. 1.

FIG. 2 illustrates a diagram of different operating modes 200 of the multipurpose communications gateway 105 and/or mobile devices 113 of FIG. 1. A coverage-sensitive mode 205 is a mode in which the multipurpose communications gateway 105 and/or mobile devices 113 are programmed or otherwise instructed to access a cellular networking having the greatest relative coverage. For example, the gateway 105 may be instructed to use a 3G network having broader coverage, even though it is not as fast as a 4G network, if it is desirable to have access to a cellular network from disparate geographic locations. Conversely, a bandwidth-sensitive mode 215 might be the preferred mode if it is desirable to have access to a cellular network having greater bandwidth capacity, such as the 4G network rather than the 3G network. Moreover, if cost if of primary concern, a cost-sensitive mode 210 can be applied, such that the cellular communications gateway 105 is programmed or otherwise instructed to select the least costly access from among the various carriers and plans. As mentioned above, the spot prices received from the various carriers, along with carrier plans, time of day, and the like, can be used in determining the least costly access.

In addition to the individual modes, hybrid or balanced modes can also be applied. For example, a balanced coverage and cost-sensitive mode 225 can balance the primary objectives of good coverage and cost sensitivity. Such a mode places less importance on bandwidth sensitivities. By way of another example, a balanced cost and bandwidth mode 230 can be applied, which balances the objectives of high bandwidth and lower cost, while discounting the importance of network coverage. By way of yet another example, a balanced coverage and bandwidth mode 220 can be applied, which primarily balances the interests of good coverage and high bandwidth, while deemphasizing cost. Finally, a fully combined balanced mode 240 can equally balance the needs of coverage, cost, and bandwidth.

In the fully combined balanced mode 240, if data associated one of the three elements of consideration (i.e., coverage, cost, and bandwidth) significantly diverges from the other two, then the divergent element may tilt the balancing logic toward that element. For example, in the fully combined balanced mode 240, if cost is considerably lower than usual while the coverage and bandwidth are in typical ranges, the cost element may weigh in favor of selecting the low-cost carrier. This can be determined by comparing the cost to predetermined threshold, by averaging, weighting, and/or other suitable methods as further described below.

Each of the categories or elements of consideration can have associated therewith their own predetermined thresholds. In this manner, the balancing logic can determine where the current operational levels of coverage, cost, and bandwidth fall relative to the predefined thresholds by comparing the current levels to the predetermined thresholds for each of the categories, and then select the carrier and/or plan based on the results of the comparisons.

Such determinations can be made by the balancing logic 137 of the remote server 135 and/or the balancing logic 107 of the communications gateway 105 or other cellular devices 113, and applied to the communications gateway 105 or other cellular devices 113 so that overall desired performance and cost savings are achieved.

When the communications gateway 105 or other cellular devices 113 are programmed or otherwise instructed to operate in accordance with a given mode, changes can automatically be made on the communications gateway 105 and/or the cellular devices 113, based on the balancing logic, to the particular cellular network being used, the particular carrier being used, and/or the particular carrier plan being used.

Figure 3:
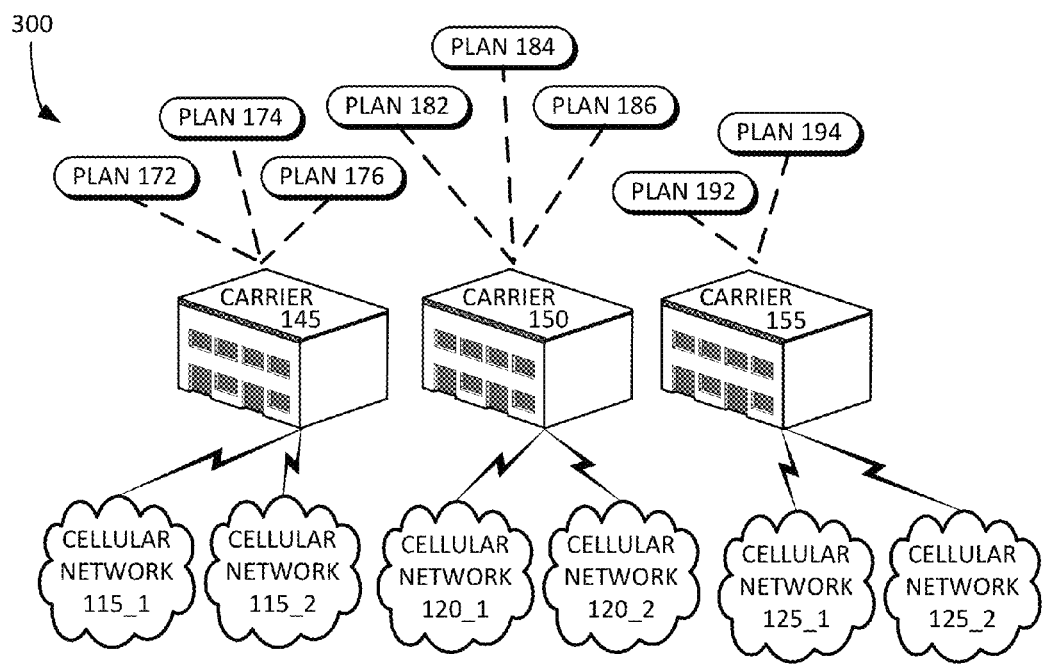
FIG. 3 illustrates a simplified schematic block diagram of an example system including various telecommunication carriers and associated cellular networks and plans.

FIG. 3 illustrates a simplified schematic block diagram 300 of an example system including various telecommunication carriers (e.g,. 145, 150, and 155) and associated cellular networks (e.g., 115_1, 115_2, 120_1, 120_2, 125_1, and 125_2) and plans (e.g., 172, 174, 176, 182, 184, 186, 192, and 194). As can be seen, a telecommunications carrier can each operate or otherwise be associated with one or more cellular networks, such as 3G networks, 4G networks, and the like. Although only two cellular networks are shown for each carrier, it will be understood that three or more cellular networks can be associated with each carrier. The carriers can also offer one or more plans to cellular customers, as explained above. A combination of a carrier, plan, and network provides a unique package or combination of features that varies in terms of coverage, cost, and performance. Given the variety of plans, carriers, and networks, a multitude of combinations are possible. The balancing logic (e.g., 137 and/or 107 of FIG. 1) can automatically analyze and select a unique combination that meets a predetermined set of criteria.

Figure 4:
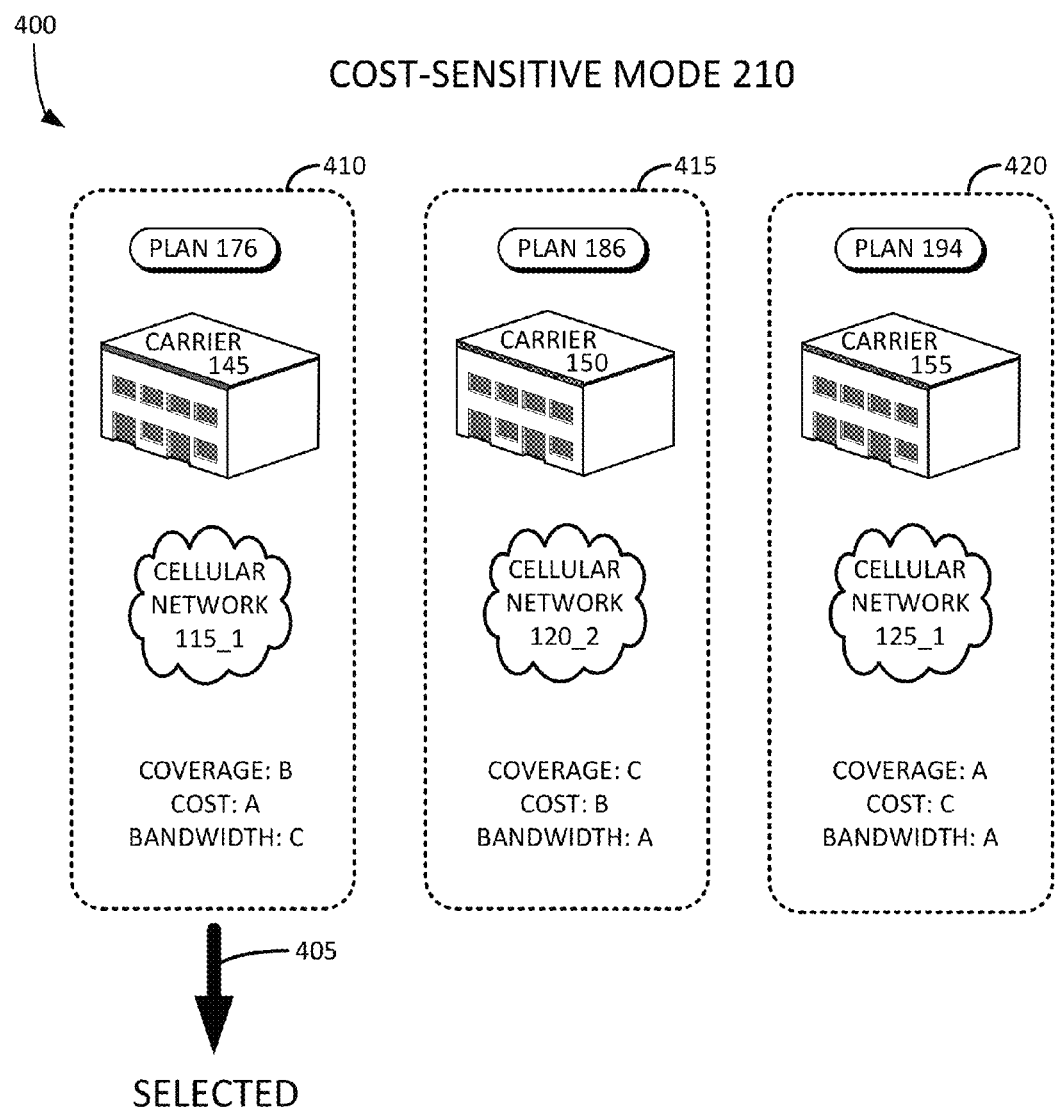
FIG. 4 illustrates an example diagram of various groupings of telecommunications carriers, networks, and plans, and a selection based on a cost-sensitive mode.

FIG. 4 illustrates an example diagram of various groupings 400 of telecommunications carriers, networks, and plans, and a selection 405 based on a cost-sensitive mode 210. It will be understood that for the sake of providing a clear and concise explanation of the inventive features described herein, the three combinations illustrated (e.g., 410, 415, and 420) are example combinations. The actual number of different possible combinations of carrier, network, and plan is quite large considering the variety of carriers, network types, network service types, and plan types available.

Different cellular access grades can be assigned to the characteristics of coverage, cost, and bandwidth of a particular combination. For example, combination 410 has a coverage grade of 'B,' a cost grade of 'A,' and a bandwidth grade of 'C.' It will be understood that grade letters 'A,'"B,"C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 4, a scenario is shown in which a cost-sensitive mode 210 is the selected or preferred mode. As can be seen, combination 410 has a coverage grade of 'B,' a cost grade of 'A,' and a bandwidth grade of 'C.' Combination 415 has a coverage grade of 'C,' a cost grade of 'B,' and a bandwidth grade of 'A.' Combination 420 has a coverage grade of 'A,' a cost grade of 'C,' and a bandwidth grade of 'A.' In the cost-sensitive mode 210, the balancing logic can compare the cost grades among the various combinations, and select the combination having the best cellular access grade. For example, given that the cost grade of 'A' for combination 410 is superior to the cost grade of 'B' for combination 415, and superior to the cost grade of 'C' for combination 420 (i.e., 4>3>2), the combination 410 is selected at 405 because it has the lowest cost for accessing the network.

This selection is made even though the coverage grade of combination 410 is inferior to the coverage grade of combination 415, and even though the bandwidth grade of combination 410 is inferior to the bandwidth grades of the other combinations 415 and 420. Since the mode in this embodiment is a cost-sensitive mode 210, the cost element controls in the automatic selection, while the coverage and bandwidth grades are discounted and/or need not be included in the analysis.

Figure 5:
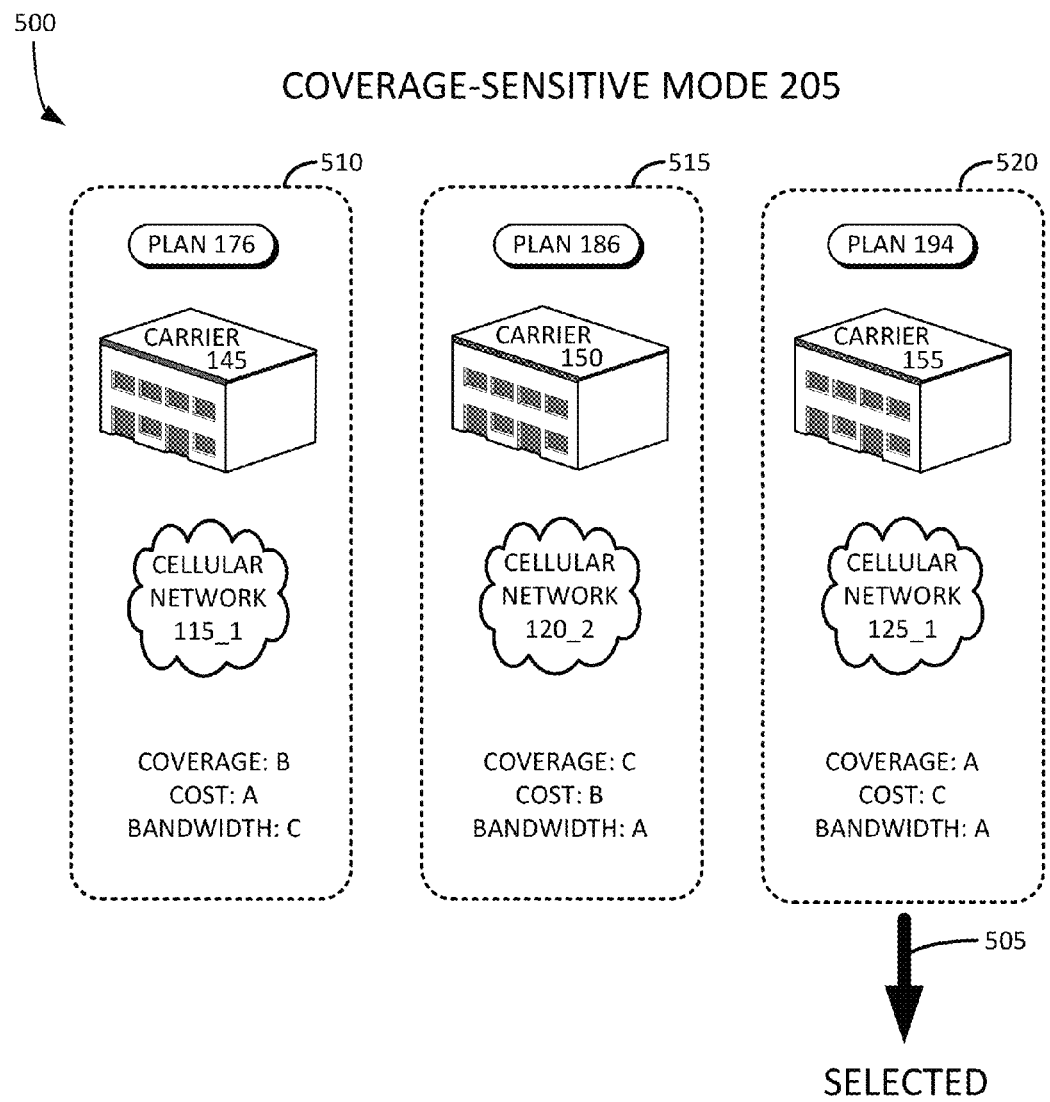
FIG. 5 illustrates an example diagram of various groupings of telecommunications carriers, networks, and plans, and a selection based on a coverage-sensitive mode.

FIG. 5 illustrates an example diagram of various groupings 500 of telecommunications carriers, networks, and plans, and a selection 505 based on a coverage-sensitive mode 205. It will be understood that for the sake of providing a clear and concise explanation of the inventive features described herein, the three combinations illustrated (e.g., 510, 515, and 520) are example combinations. As mentioned above, the actual number of different possible combinations of carrier, network, and plan is quite large considering the variety of carriers, network types, network service types, and plan types available.

Different cellular access grades can be assigned to the characteristics of coverage, cost, and bandwidth of a particular combination. For example, combination 510 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 5, a scenario is shown in which a coverage-sensitive mode 205 is the selected or preferred mode. As can be seen, combination 510 has a coverage grade of 'B,' a cost grade of 'A,' and a bandwidth grade of 'C.' Combination 515 has a coverage grade of 'C,' a cost grade of 'B,' and a bandwidth grade of 'A.' Combination 520 has a coverage grade of 'A,' a cost grade of 'C,' and a bandwidth grade of 'A.' In the coverage-sensitive mode 205, the balancing logic can compare the coverage grades among the various combinations, and select the combination having the best grade. For example, given that the coverage grade of 'A' for combination 520 is superior to the coverage grade of 'B' for combination 510, and superior to the coverage grade of 'C' for combination 515 (i.e., 4>3>2), the combination 520 is selected at 505 because it has the best coverage (e.g., geographical coverage, signal strength, etc.) for accessing the network.

This selection is made even though the cost grade of combination 520 is inferior to the cost grade of the other combinations 510 and 515. Since the mode in this embodiment is a coverage-sensitive mode 205, the coverage element controls in the automatic selection.

Figure 6:
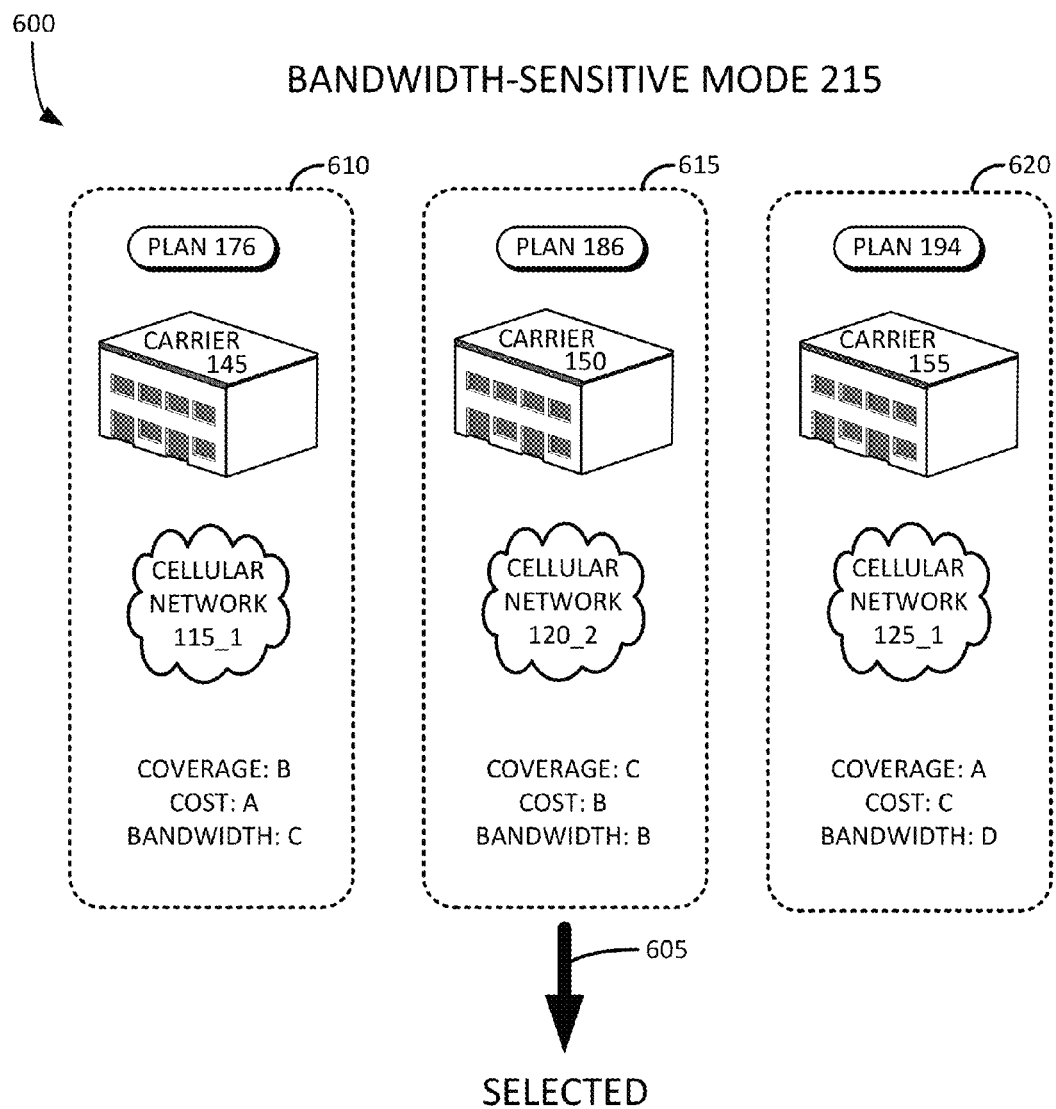
FIG. 6 illustrates an example diagram of various groupings of telecommunications carriers, networks, and plans, and a selection based on a bandwidth-sensitive mode.

FIG. 6 illustrates an example diagram of various groupings 600 of telecommunications carriers, networks, and plans, and a selection 605 based on a bandwidth-sensitive mode 215. It will be understood that for the sake of providing a clear and concise explanation of the inventive features described herein, the three combinations illustrated (e.g., 610, 615, and 620) are example combinations.

Different cellular access grades can be assigned to the characteristics of coverage, cost, and bandwidth of a particular combination. For example, combination 610 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 6, a scenario is shown in which a bandwidth-sensitive mode 215 is the selected or preferred mode. As can be seen, combination 610 has a coverage grade of 'B,' a cost grade of 'A,' and a bandwidth grade of 'C.' Combination 615 has a coverage grade of 'C,' a cost grade of 'B,' and a bandwidth grade of 'B.' Combination 620 has a coverage grade of 'A,' a cost grade of 'C,' and a bandwidth grade of 'D.' In the bandwidth-sensitive mode 215, the balancing logic can compare the bandwidth grades among the various combinations, and select the combination having the best grade. For example, given that the bandwidth grade of 'B' for combination 615 is superior to the bandwidth grade of 'C' for combination 610 (i.e., 3>2), and superior to the bandwidth grade of 'D' for combination 620 (i.e., 3>1), the combination 615 is selected at 605 because it has the highest bandwidth for accessing the network.

This selection is made even though the coverage grade of combination 615 is inferior to the coverage grades of combinations 610 and 620, and even though the cost grade of combination 615 is inferior to the cost grade of combination 610. Since the mode in this embodiment is a bandwidth-sensitive mode 215, the bandwidth element controls in the automatic selection, while the coverage and cost grades are discounted and/or need not be included in the analysis.

Figure 7:
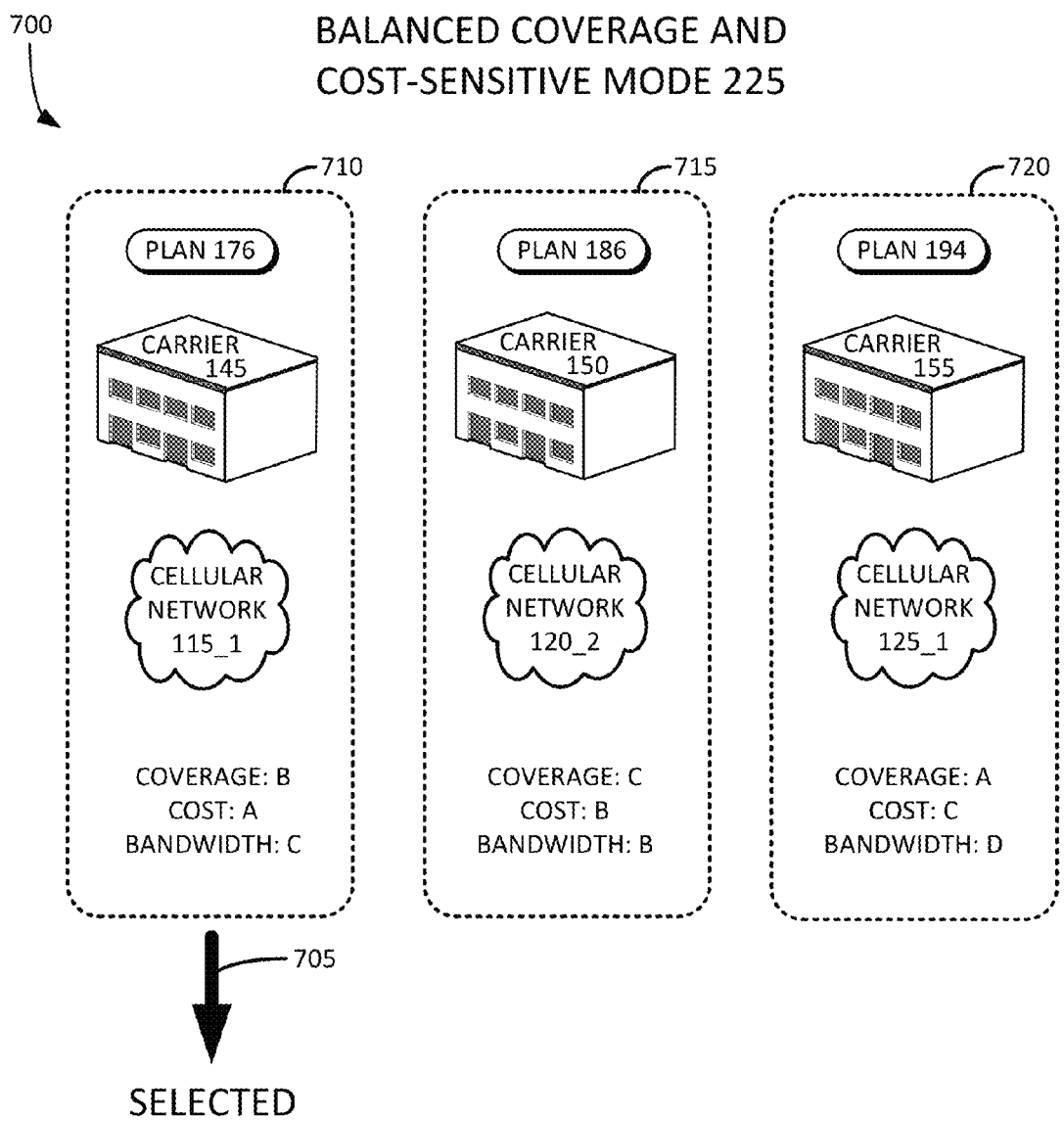
FIG. 7 illustrates an example diagram of various groupings of telecommunications carriers, networks, and plans, and a selection based on a coverage and cost-sensitive mode.

FIG. 7 illustrates an example diagram of various groupings 700 of telecommunications carriers, networks, and plans, and a selection 705 based on a coverage and cost-sensitive mode 225. It will be understood that for the sake of providing a clear and concise explanation of the inventive features described herein, the three combinations illustrated (e.g., 710, 715, and 720) are example combinations.

Different cellular access grades can be assigned to the characteristics of coverage, cost, and bandwidth of a particular combination. For example, combination 710 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 7, a scenario is shown in which a balanced coverage and cost-sensitive mode 225 is the selected or preferred mode. As can be seen, combination 710 has a coverage grade of 'B,' a cost grade of 'A,' and a bandwidth grade of 'C.' Combination 715 has a coverage grade of 'C,' a cost grade of 'B,' and a bandwidth grade of 'B.' Combination 720 has a coverage grade of 'A,' a cost grade of 'C,' and a bandwidth grade of 'D.' In the balanced coverage and cost-sensitive mode 225, the balancing logic can compare both the coverage and cost grades among the various combinations, and select the combination having the best overall average grade, or balance of coverage and cost.

For example, the coverage grade of 710 is 'B' (i.e., 3) and the cost grade of 710 is 'A' (i.e., 4). The balancing logic can compute an average of the cost and coverage grades. For example, the average can be 3.5 (i.e., (4+3)/2). Similarly, averages can be computed for combinations 715 and 720. For combination 715, the coverage grade is 'C' (i.e., 2) and the cost grade is 'B' (i.e., 3), and so the average of the cost and coverage grades is 2.5 (i.e., (2+3)/2). For combination 720, the coverage grade is 'A' (i.e., 4) and the cost grade is 'C' (i.e., 2), and so the average of the cost and coverage grades is 3 (i.e., (4+2)/2). Given that the average of 3.5 for combination 710 is greater than the both of the other averages, the combination 710 can be automatically selected. If weights are used, then the weights can be multiplied with the individual grades or scores prior to the averaging computation (i.e., (4X+3Y)/2, where X and Y are weights).

The selection of combination 710 is made even though the bandwidth grade of combination 710 is inferior to the bandwidth grade of combination 715. Since the mode in this embodiment is a balanced coverage and cost-sensitive mode 225, the coverage and cost elements control in the automatic selection, while the bandwidth grade is discounted and/or need not be balanced or included in the analysis.

Figure 8:
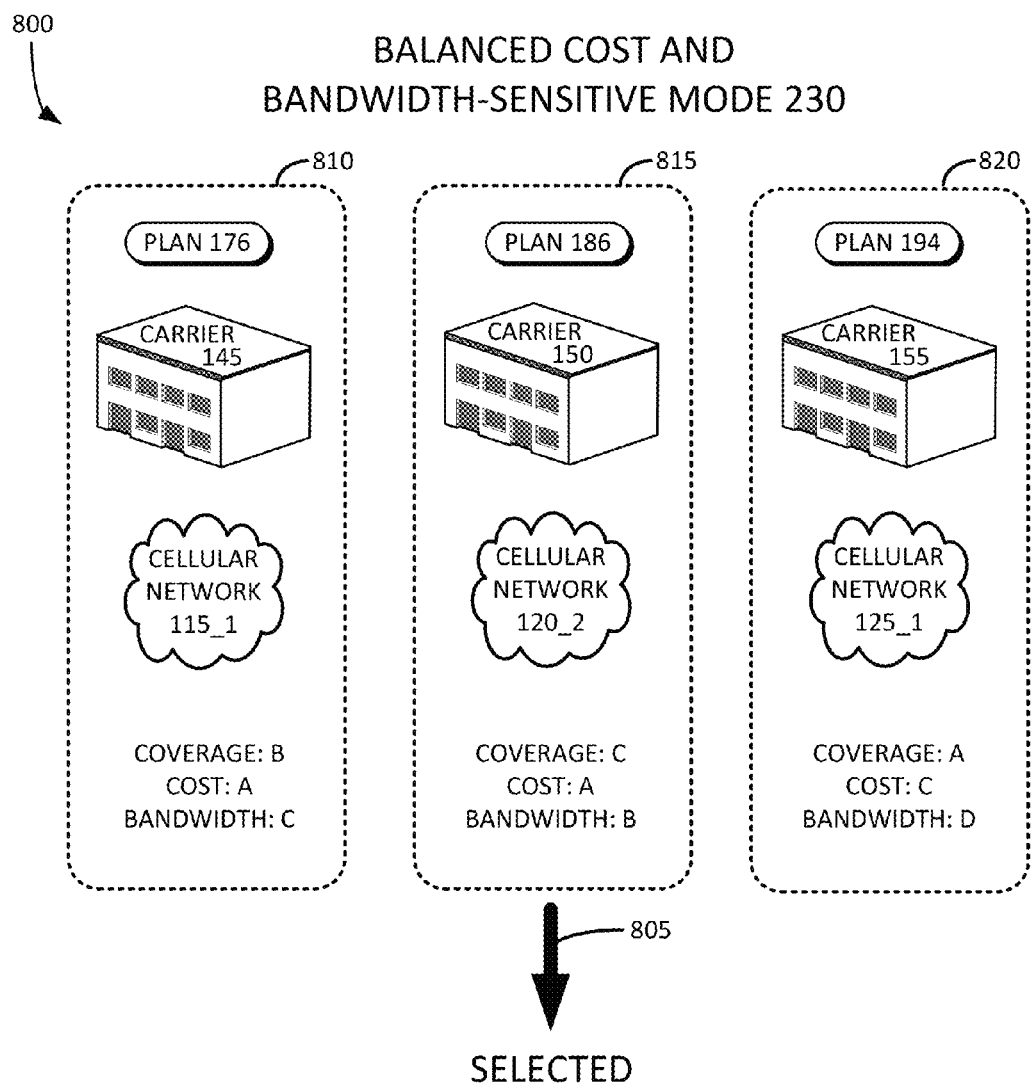
FIG. 8 illustrates an example diagram of various groupings of telecommunications carriers, networks, and plans, and a selection based on a cost and bandwidth-sensitive mode.

FIG. 8 illustrates an example diagram of various groupings 800 of telecommunications carriers, networks, and plans, and a selection 805 based on a cost and bandwidth-sensitive mode 230. It will be understood that for the sake of providing a clear and concise explanation of the inventive features described herein, the three combinations illustrated (e.g., 810, 815, and 820) are example combinations.

Different cellular access grades can be assigned to the characteristics of coverage, cost, and bandwidth of a particular combination. For example, combination 810 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 8, a scenario is shown in which a balanced cost and bandwidth-sensitive mode 230 is the selected or preferred mode. As can be seen, combination 810 has a coverage grade of 'B,' a cost grade of 'A,' and a bandwidth grade of 'C.' Combination 815 has a coverage grade of 'C,' a cost grade of 'A,' and a bandwidth grade of 'B.' Combination 820 has a coverage grade of 'A,' a cost grade of 'C,' and a bandwidth grade of 'D.' In the balanced cost and bandwidth-sensitive mode 230, the balancing logic can compare both the cost and bandwidth grades among the various combinations, and select the combination having the best overall average grade, or balance of cost and bandwidth.

For example, the cost grade of combination 815 is 'A' (i.e., 4) and the bandwidth grade of combination 815 is 'B' (i.e., 3). The balancing logic can compute an average of the cost and bandwidth grades. For example, the average can be 3.5 (i.e., (4+3)/2). Similarly, averages can be computed for combinations 810 and 820. For combination 810, the cost grade is 'A' (i.e., 4) and the bandwidth grade is 'C' (i.e., 2), and so the average of the cost and bandwidth grades is 3 (i.e., (4+2)/2). For combination 820, the cost grade is 'C' (i.e., 2) and the bandwidth grade is 'D' (i.e., 1), and so the average of the cost and bandwidth grades is 1.5 (i.e., (2+1)/2). Given that the average of 3.5 for combination 815 is greater than the both of the other averages, the combination 815 can be automatically selected. If weights are used, then the weights can be multiplied with the individual grades or scores prior to the averaging computation (i.e., (4Y+3Z)/2, where Y and Z are weights).

The selection of combination 815 is made even though the coverage grade of combination 815 is inferior to the coverage grades of the other combinations 810 and 820. Since the mode in this embodiment is a balanced cost and bandwidth-sensitive mode 225, the cost and bandwidth elements control in the automatic selection, while the coverage grade is discounted and/or need not be balanced or included in the analysis.

Figure 9:
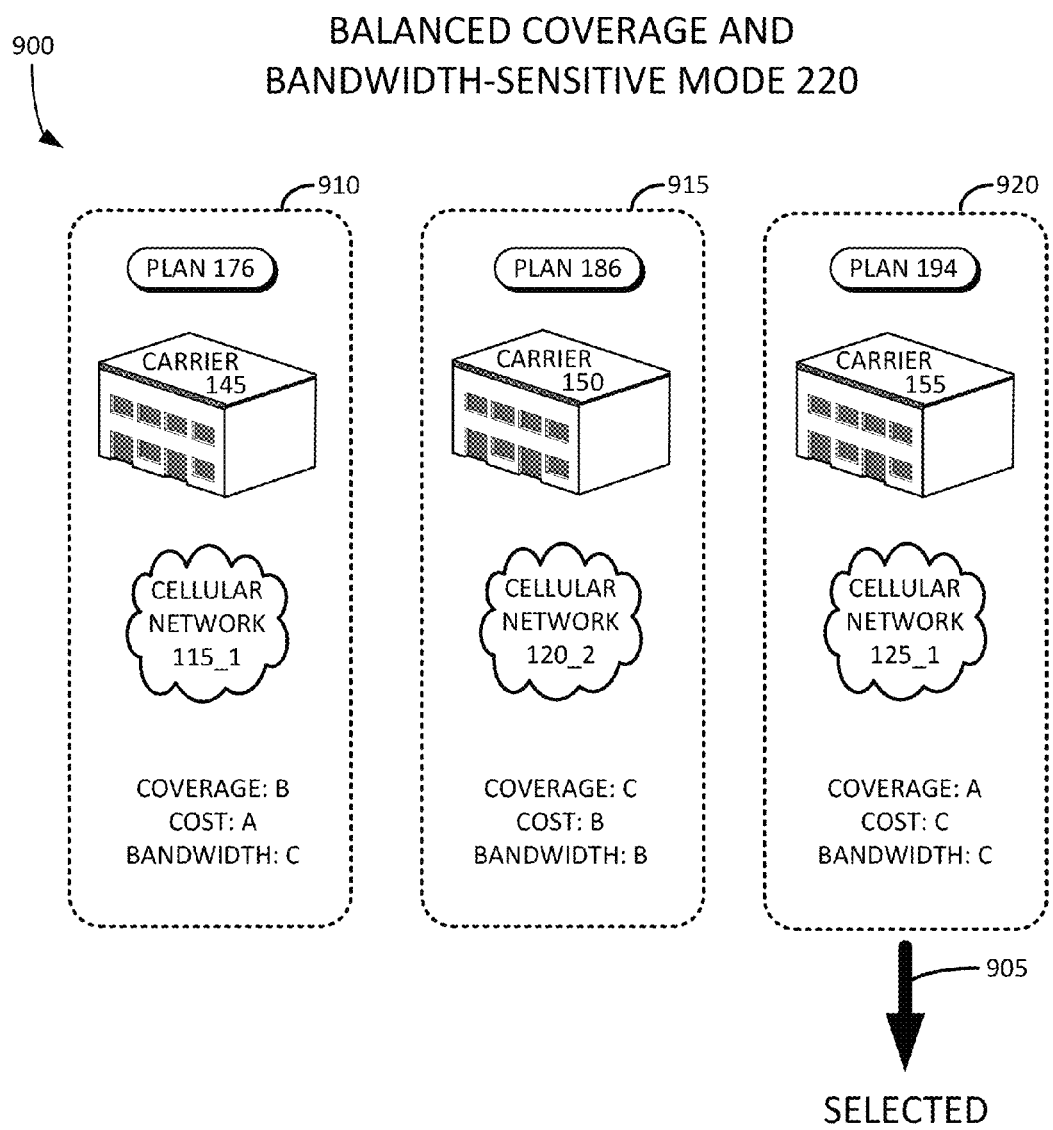
FIG. 9 illustrates an example diagram of various groupings of telecommunications carriers, networks, and plans, and a selection based on a coverage and bandwidth-sensitive mode.

FIG. 9 illustrates an example diagram of various groupings 900 of telecommunications carriers, networks, and plans, and a selection 905 based on a coverage and bandwidth-sensitive mode 220. It will be understood that for the sake of providing a clear and concise explanation of the inventive features described herein, the three combinations illustrated (e.g., 910, 915, and 920) are example combinations.

Different cellular access grades can be assigned to the characteristics of coverage, cost, and bandwidth of a particular combination. For example, combination 910 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 9, a scenario is shown in which a balanced coverage and bandwidth-sensitive mode 220 is the selected or preferred mode. As can be seen, combination 910 has a coverage grade of 'B,' a cost grade of 'A,' and a bandwidth grade of 'C.' Combination 915 has a coverage grade of 'C,' a cost grade of 'B,' and a bandwidth grade of 'B.' Combination 920 has a coverage grade of 'A,' a cost grade of 'C,' and a bandwidth grade of 'C.' In the balanced coverage and bandwidth-sensitive mode 220, the balancing logic can compare both the coverage and bandwidth grades among the various combinations, and select the combination having the best overall average grade, or balance of coverage and bandwidth.

For example, the coverage grade of combination 920 is 'A' (i.e., 4) and the bandwidth grade of combination 920 is 'C' (i.e., 2). The balancing logic can compute an average of the coverage and bandwidth grades. For example, the average can be 3 (i.e., (4+2)/2). Similarly, averages can be computed for combinations 910 and 915. For combination 910, the coverage grade is 'B' (i.e., 3) and the bandwidth grade is 'C' (i.e., 2), and so the average of the coverage and bandwidth grades is 2.5 (i.e., (3+2)/2). For combination 915, the coverage grade is 'C' (i.e., 2) and the bandwidth grade is 'B' (i.e., 3), and so the average of the coverage and bandwidth grades is 2.5 (i.e., (3+2)/2). Given that the average of 3 for combination 920 is greater than the both of the other averages, the combination 920 can be automatically selected. If weights are used, then the weights can be multiplied with the individual grades or scores prior to the averaging computation (i.e., (4X+2Z)/2, where X and Z are weights).

The selection of combination 920 is made even though the cost grade of combination 920 is inferior to the cost grades of the other combinations 910 and 915. Since the mode in this embodiment is a balanced coverage and bandwidth-sensitive mode 220, the coverage and bandwidth elements control in the automatic selection, while the cost grade is discounted and/or need not be balanced or included in the analysis.

Figure 10:
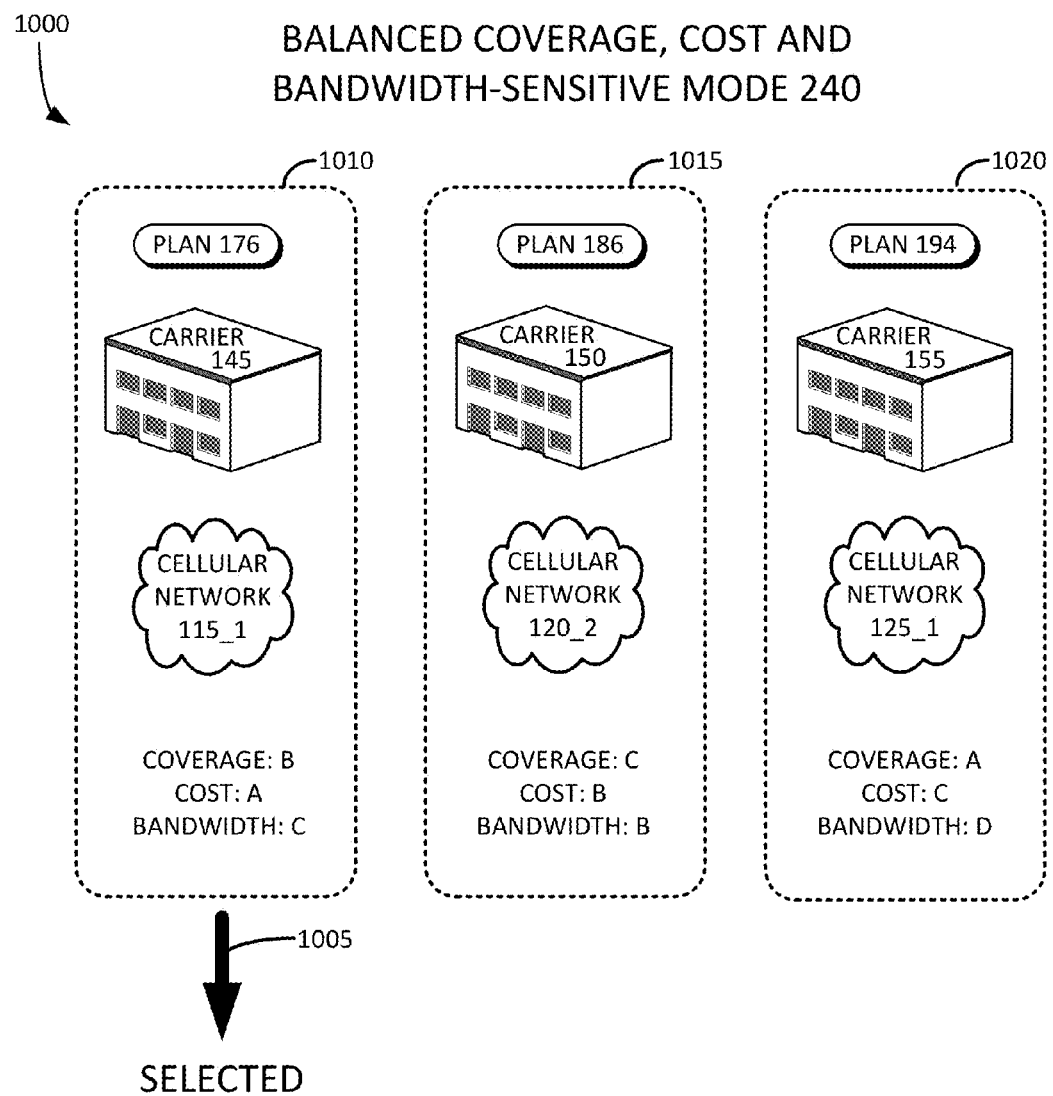
FIG. 10 illustrates an example diagram of various groupings of telecommunications carriers, networks, and plans, and a selection based on a coverage, cost, and bandwidth-sensitive mode.

FIG. 10 illustrates an example diagram of various groupings 1000 of telecommunications carriers, networks, and plans, and a selection 1005 based on a coverage, cost, and bandwidth-sensitive mode 240. It will be understood that for the sake of providing a clear and concise explanation of the inventive features described herein, the three combinations illustrated (e.g., 1010, 1015, and 1020) are example combinations.

Different cellular access grades can be assigned to the characteristics of coverage, cost, and bandwidth of a particular combination. For example, combination 1010 has a coverage grade of 'B,' a cost grade of 'A,' and a bandwidth grade of 'C.' It will be understood that grade letters 'A,' 'B,' 'C,' etc., are examples of cellular access grades, and are chosen here to simplify the description. Instead of cellular access grades, cellular access scores (e.g., integers or floating point numbers) or thresholds can also be used. Weights can also be added (e.g., AX, BY, CZ, where X, Y, and Z are weights that can be multiplied with 'A,' 'B,' and 'C,' respectively) so that one of the elements of coverage, cost, and bandwidth is given more or less influence over the others. The weights can be any suitable integer or floating point number. For the purpose of explaining the inventive principals herein, an 'A' is considered equivalent to a value of 4, a 'B' to a value of 3, a 'C' to a value of 2, and a 'D' to a value of 1, where higher values are superior to lower values.

Referring to FIG. 10, a scenario is shown in which a balanced coverage, cost, and bandwidth-sensitive mode 240 is the selected or preferred mode. As can be seen, combination 1010 has a coverage grade of 'B,' a cost grade of 'A,' and a bandwidth grade of 'C.' Combination 1015 has a coverage grade of 'C,' a cost grade of 'B,' and a bandwidth grade of 'B.' Combination 1020 has a coverage grade of 'A,' a cost grade of 'C,' and a bandwidth grade of 'D.' In the balanced coverage, cost, and bandwidth-sensitive mode 240, the balancing logic can compare all of the coverage, cost, and bandwidth grades among the various combinations, and select the combination having the best overall average grade, or balance of coverage, cost, and bandwidth.

For example, the coverage grade of combination 1010 is 'B' (i.e., 3), the cost grade of combination 1010 is 'A' (i.e., 4), the bandwidth grade of combination 1010 is 'C' (i.e., 2). The balancing logic can compute an average of the coverage, cost, and bandwidth grades. For example, the average can be 3 (i.e., (3+4+2)/3). Similarly, averages can be computed for combinations 1015 and 1020. For combination 1015, the coverage grade is 'C' (i.e., 2), the cost grade is 'B' (i.e., 3), and the bandwidth grade is 'B' (i.e., 3), and so the average of the coverage, cost, and bandwidth grades is 2.67 (i.e., (2+3+3)/3). For combination 1020, the coverage grade is 'A' (i.e., 4), the cost grade is 'C' (i.e., 2), and the bandwidth grade is 'D' (i.e., 1), and so the average of the coverage, cost, and bandwidth grades is 2.33 (i.e., (4+2+1)/3). Given that the average of 3 for combination 1010 is greater than the both of the other averages, the combination 1010 can be automatically selected. If weights are used, then the weights can be multiplied with the individual grades or scores prior to the averaging computation (i.e., (3X+4Y+2Z)/3, where X, Y, and Z are weights).

Since the mode in this embodiment is a balanced coverage, cost, and bandwidth-sensitive mode 240, all of the coverage, cost, and bandwidth elements control in the automatic selection.

Figure 11:
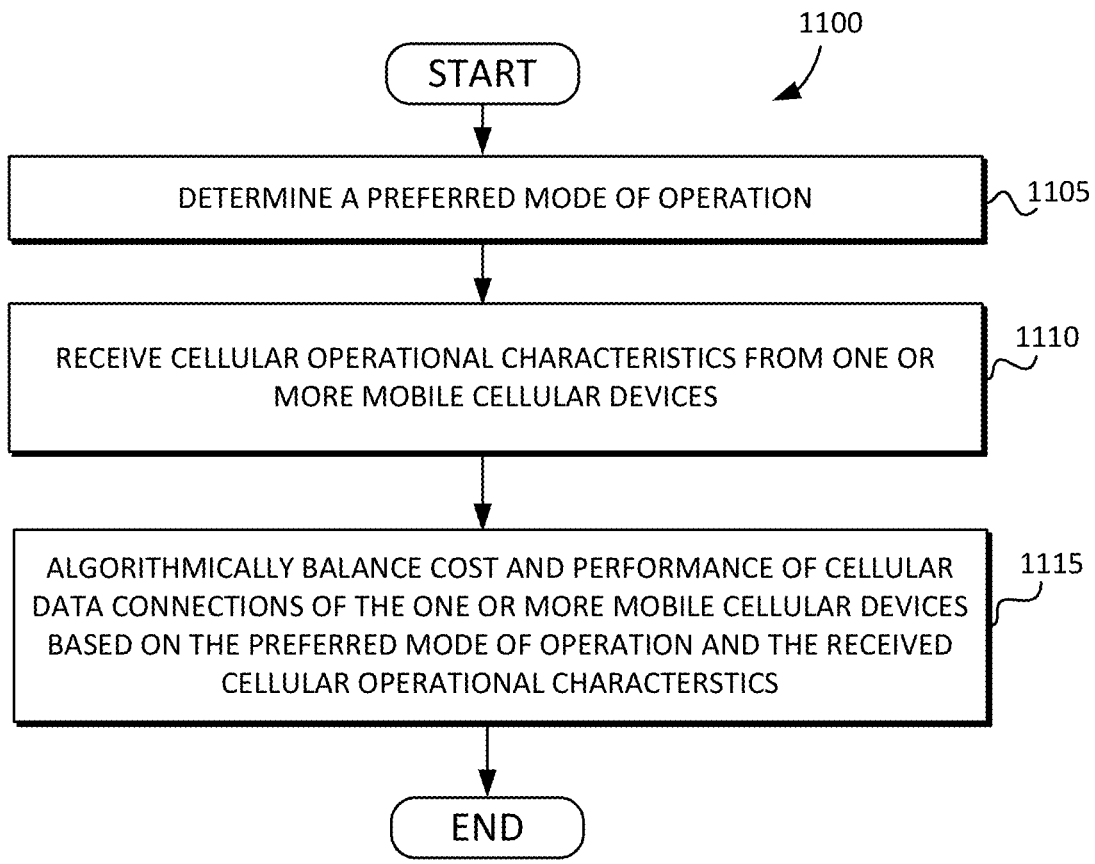
FIG. 11 is an example flow diagram illustrating a technique for algorithmically balancing cost and performance of cellular data connections in accordance with embodiments of the present invention.

FIG. 11 is an example flow diagram 1100 illustrating a technique for algorithmically balancing cost and performance of cellular data connections in accordance with embodiments of the present invention.

The flow begins at 1105, where a preferred mode of operation is selected or otherwise determined. The flow proceeds to 1110, where cellular operational characteristics are received from one or more mobile cellular devices. At 1115, cost and performance of the cellular data connections of the one or more mobile cellular devices are algorithmically balanced based on the preferred mode of operation and the received cellular operational characteristics.

Figure 12:
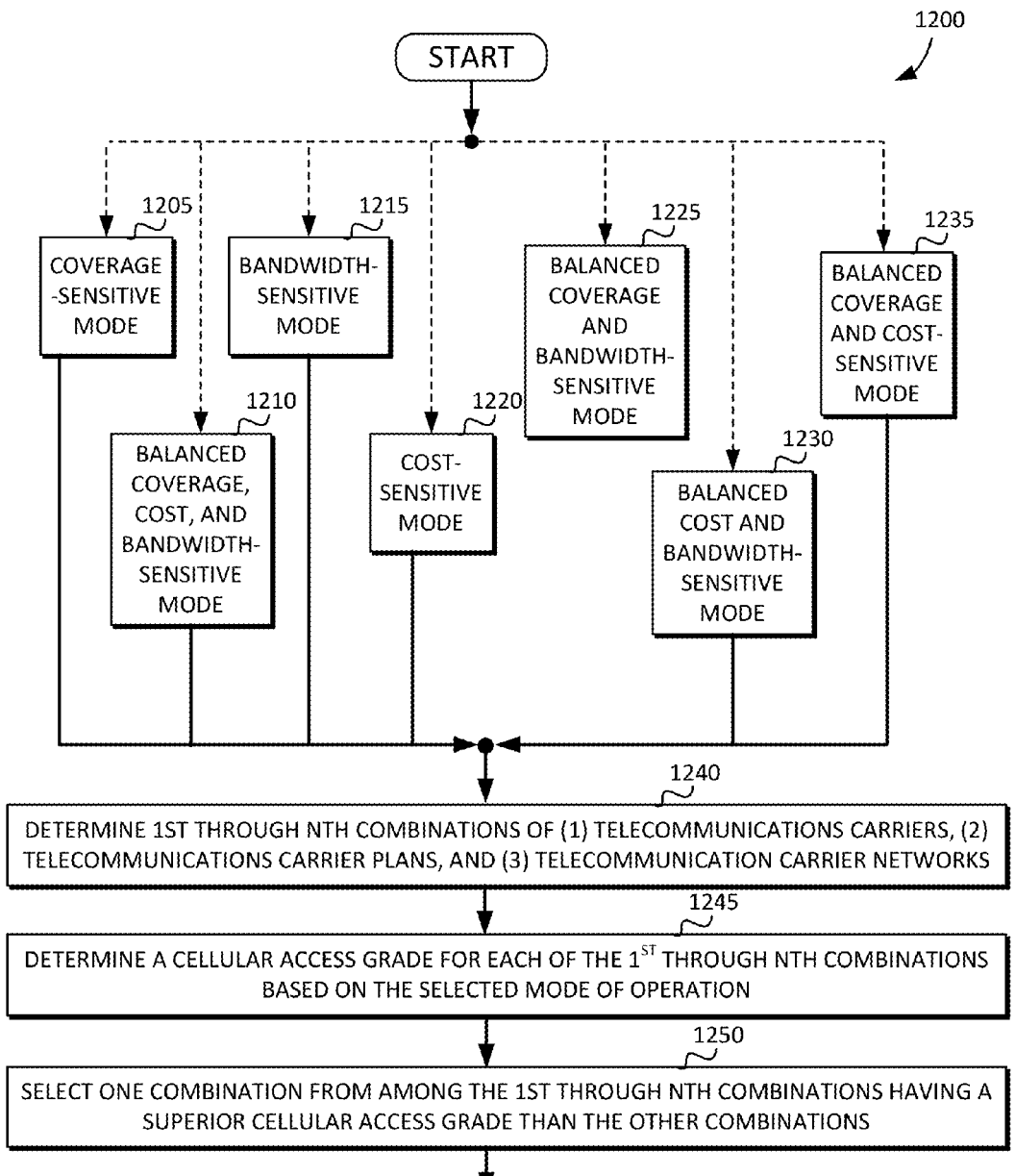
FIG. 12 is another example flow diagram illustrating a technique for algorithmically balancing cost and performance of cellular data connections in accordance with embodiments of the present invention.

FIG. 12 is another example flow diagram 1200 illustrating a technique for algorithmically balancing cost and performance of cellular data connections in accordance with embodiments of the present invention.

Determining the preferred mode of operation can include selecting a mode of operation from among a multitude of modes of operation. The flow can proceed along one of a number of paths, representing modes of operation, such as the coverage-sensitive mode of operation 1205, the cost-sensitive mode of operation 1220, the bandwidth-sensitive mode of operation 1215, the balanced coverage and cost-sensitive mode of operation 1235, the balanced cost and bandwidth-sensitive mode of operation 1230, the balanced coverage and bandwidth-sensitive mode of operation 1225, and/or the balanced coverage, cost, and bandwidth mode of operation 1210.

The flow then proceeds to 1240, where 1st through Nth combinations of (1) telecommunications carriers, (2) telecommunication carrier plans, and (3) telecommunication carrier networks are determined. At 1245, a cellular access grade (e.g., highest average grade) is determined for each of the 1st through Nth combinations based on the selected mode of operation. At 1250, one combination from among the 1st through Nth combinations having a superior cellular access grade than the other combinations is selected.

It will be understood that the elements and determinations illustrated in the flow diagrams of FIGS. 11 and 12 need not occur in the order as illustrated, but rather, different elements and determinations can be interposed between the ones illustrated, or appear in a different order.

Some embodiments include a device, system and/or method for algorithmically balancing cost and performance of cellular data connections, the method comprising: determining a preferred mode of operation, receiving, from one or more mobile cellular devices, a plurality of cellular operational characteristics, and algorithmically balancing cost and performance of the cellular data connections of the one or more mobile cellular devices based on the preferred mode of operation and the received cellular operational characteristics.

Determining the preferred mode of operation may include selecting a mode of operation from among a plurality of modes of operation, wherein the plurality of modes of operation include a coverage-sensitive mode of operation, a cost-sensitive mode of operation, and a bandwidth-sensitive mode of operation.

The plurality of modes of operation may further include: a balanced coverage and cost-sensitive mode of operation, a balanced cost and bandwidth-sensitive mode of operation, a balanced coverage and bandwidth-sensitive mode of operation, and a balanced coverage, cost, and bandwidth mode of operation.

Some embodiments include a device, system and/or method for determining 1st through Nth combinations of (1) telecommunications carriers, (2) telecommunication carrier plans, and (3) telecommunication carrier networks.

Some embodiments include a device, system and/or method for selecting the coverage-sensitive mode of operation, comparing a coverage grade of each of the 1st through Nth combinations to each other, and selecting one combination from among the 1st through Nth combinations having a coverage grade that is superior to the coverage grade of the other combinations from among the 1st through Nth combinations.

Some embodiments include a device, system and/or method for selecting the cost-sensitive mode of operation, comparing a cost grade of each of the 1st through Nth combinations to each other, and selecting one combination from among the 1st through Nth combinations having a cost grade that is superior to the cost grade of the other combinations from among the 1st through Nth combinations.

Some embodiments include a device, system and/or method for selecting the bandwidth-sensitive mode of operation, comparing a bandwidth grade of each of the 1st through Nth combinations to each other, and selecting one combination from among the 1st through Nth combinations having a bandwidth grade that is superior to the cost grade of the other combinations from among the 1st through Nth combinations.

Some embodiments include a device, system and/or method for automatically switching from one telecommunications carrier to another based on the selected mode of operation and the received cellular operational characteristics.

Some embodiments include a device, system and/or method for automatically switching from one telecommunications network to another based on the selected mode of operation and the received cellular operational characteristics.

Some embodiments include a device, system and/or method for selecting the balanced coverage and cost-sensitive mode of operation, generating a plurality of averages, each average corresponding to an average of a coverage grade and a cost grade for one of the 1st through Nth combinations, comparing the plurality of averages associated with the 1st through Nth combinations to each other, and selecting one combination from among the 1st through Nth combinations having an average that is superior to the averages associated with the other combinations from among the 1st through Nth combinations.

Some embodiments include a device, system and/or method for selecting the balanced cost and bandwidth-sensitive mode of operation, generating a plurality of averages, each average corresponding to an average of a cost grade and a bandwidth grade for one of the 1st through Nth combinations, comparing the plurality of averages associated with the 1st through Nth combinations to each other, and selecting one combination from among the 1st through Nth combinations having an average that is superior to the averages associated with the other combinations from among the 1st through Nth combinations.

Some embodiments include a device, system and/or method for selecting the balanced coverage and bandwidth-sensitive mode of operation, generating a plurality of averages, each average corresponding to an average of a coverage grade and a bandwidth grade for one of the 1st through Nth combinations, comparing the plurality of averages associated with the 1st through Nth combinations to each other, and selecting one combination from among the 1st through Nth combinations having an average that is superior to the averages associated with the other combinations from among the 1st through Nth combinations.

Some embodiments include a device, system and/or method for selecting the balanced coverage, cost, and bandwidth-sensitive mode of operation, generating a plurality of averages, each average corresponding to an average of a coverage grade, a cost grade, and a bandwidth grade for one of the 1st through Nth combinations, comparing the plurality of averages associated with the 1st through Nth combinations to each other, and selecting one combination from among the 1st through Nth combinations having an average that is superior to the averages associated with the other combinations from among the 1st through Nth combinations.

Some embodiments include a device, system and/or method for managing a pool of telecommunications carrier plans from among one or more telecommunications carriers, automatically selecting a plan from among the pool of plans according to predefined criteria, and transmitting a rule to the one or more mobile cellular devices instructing the one or more mobile cellular devices to obtain cellular access through the selected plan.

Some embodiments include a device, system and/or method for detecting, by a remote server, that the one or more mobile cellular devices is nearing an end of a billing cycle, and transmitting an instruction to the one or more mobile cellular devices to temporarily disable access to any cellular network until the beginning of a next billing cycle.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for algorithmically balancing cost and performance of cellular data connections, the method comprising:
   determining a preferred mode of operation;
   receiving, from one or more mobile cellular devices, a plurality of cellular operational characteristics;
   algorithmically balancing cost and performance of the cellular data connections of the one or more mobile cellular devices based on the preferred mode of operation and the received cellular operational characteristics;
   detecting, by a remote server, that the one or more mobile cellular devices is nearing an end of a billing cycle; and
   transmitting an instruction to the one or more mobile cellular devices to temporarily disable access to any cellular network until the beginning of a next billing cycle.

2. The method of claim 1, wherein determining the preferred mode of operation includes:
   selecting a mode of operation from among a plurality of modes of operation, wherein the plurality of modes of operation include:
   a coverage-sensitive mode of operation, a cost-sensitive mode of operation, and a bandwidth-sensitive mode of operation.

3. The method of claim 2, wherein the plurality of modes of operation further include:
   a balanced coverage and cost-sensitive mode of operation;
   a balanced cost and bandwidth-sensitive mode of operation;
   a balanced coverage and bandwidth-sensitive mode of operation; and
   a balanced coverage, cost, and bandwidth mode of operation.

4. The method of claim 2, further comprising:
   determining 1st through Nth combinations of (1) telecommunications carriers, (2) telecommunication carrier plans, and (3) telecommunication carrier networks;
   selecting the coverage-sensitive mode of operation;
   comparing a coverage grade of each of the 1st through Nth combinations to each other; and
   selecting one combination from among the 1st through Nth combinations having a coverage grade that is superior to the coverage grade of the other combinations from among the 1st through Nth combinations.

5. The method of claim 2, further comprising:
   determining 1st through Nth combinations of (1) telecommunications carriers, (2) telecommunication carrier plans, and (3) telecommunication carrier networks;
   selecting the cost-sensitive mode of operation;
   comparing a cost grade of each of the 1st through Nth combinations to each other; and
   selecting one combination from among the 1st through Nth combinations having a cost grade that is superior to the cost grade of the other combinations from among the 1st through Nth combinations.

6. The method of claim 2, further comprising:
   determining 1st through Nth combinations of (1) telecommunications carriers, (2) telecommunication carrier plans, and (3) telecommunication carrier networks;
   selecting the bandwidth-sensitive mode of operation;
   comparing a bandwidth grade of each of the 1st through Nth combinations to each other; and
   selecting one combination from among the 1st through Nth combinations having a bandwidth grade that is superior to the cost grade of the other combinations from among the 1st through Nth combinations.

7. The method of claim 2, wherein algorithmically balancing further comprises:
   automatically switching from one telecommunications carrier to another based on the selected mode of operation and the received cellular operational characteristics.

8. The method of claim 2, wherein algorithmically balancing further comprises:
   automatically switching from one telecommunications carrier plan to another based on the selected mode of operation and the received cellular operational characteristics.

9. The method of claim 2, wherein algorithmically balancing further comprises:
   automatically switching from one telecommunications network to another based on the selected mode of operation and the received cellular operational characteristics.

10. A method for algorithmically balancing cost and performance of cellular data connections, the method comprising:
    determining a preferred mode of operation;
    receiving, from one or more mobile cellular devices, a plurality of cellular operational characteristics;
    algorithmically balancing cost and performance of the cellular data connections of the one or more mobile cellular devices based on the preferred mode of operation and the received cellular operational characteristics;
    wherein determining the preferred mode of operation includes:
       selecting a mode of operation from among a plurality of modes of operation,
       wherein the plurality of modes of operation include:
          a coverage-sensitive mode of operation, a cost-sensitive mode of operation, and a bandwidth-sensitive mode of operation;
       wherein the plurality of modes of operation further include:
          a balanced coverage and cost-sensitive mode of operation;
          a balanced cost and bandwidth-sensitive mode of operation;
          a balanced coverage and bandwidth-sensitive mode of operation; and
          a balanced coverage, cost, and bandwidth mode of operation;
    the method further comprising:
       determining 1st through Nth combinations of (1) telecommunications carriers, (2) telecommunication carrier plans, and (3) telecommunication carrier networks;
       selecting the balanced coverage and cost-sensitive mode of operation;
       generating a plurality of averages, each average corresponding to an average of a coverage grade and a cost grade for one of the 1st through Nth combinations;
       comparing the plurality of averages associated with the 1st through Nth combinations to each other; and selecting one combination from among the 1st through Nth combinations having an average that is superior to the averages associated with the other combinations from among the 1st through Nth combinations.

11. A method for algorithmically balancing cost and performance of cellular data connections, the method comprising:

determining a preferred mode of operation;

receiving, from one or more mobile cellular devices, a plurality of cellular operational characteristics;

algorithmically balancing cost and performance of the cellular data connections of the one or more mobile cellular devices based on the preferred mode of operation and the received cellular operational characteristics;

wherein determining the preferred mode of operation includes:
  selecting a mode of operation from among a plurality of modes of operation,
  wherein the plurality of modes of operation include:
    a coverage-sensitive mode of operation, a cost-sensitive mode of operation, and a bandwidth-sensitive mode of operation;
  wherein the plurality of modes of operation further include:
    a balanced coverage and cost-sensitive mode of operation;
    a balanced cost and bandwidth-sensitive mode of operation;
    a balanced coverage and bandwidth-sensitive mode of operation; and
    a balanced coverage, cost, and bandwidth mode of operation;

the method further comprising:

determining 1st through Nth combinations of (1) telecommunications carriers, (2) telecommunication carrier plans, and (3) telecommunication carrier networks;

selecting the balanced cost and bandwidth-sensitive mode of operation;

generating a plurality of averages, each average corresponding to an average of a cost grade and a bandwidth grade for one of the 1st through Nth combinations;

comparing the plurality of averages associated with the 1st through Nth combinations to each other; and selecting one combination from among the 1st through Nth combinations having an average that is superior to the averages associated with the other combinations from among the 1st through Nth combinations.

12. A method for algorithmically balancing cost and performance of cellular data connections, the method comprising:

determining a preferred mode of operation;

receiving, from one or more mobile cellular devices, a plurality of cellular operational characteristics;

algorithmically balancing cost and performance of the cellular data connections of the one or more mobile cellular devices based on the preferred mode of operation and the received cellular operational characteristics;

wherein determining the preferred mode of operation includes:
  selecting a mode of operation from among a plurality of modes of operation,
  wherein the plurality of modes of operation include:
    a coverage-sensitive mode of operation, a cost-sensitive mode of operation, and a bandwidth-sensitive mode of operation;
  wherein the plurality of modes of operation further include:
    a balanced coverage and cost-sensitive mode of operation;
    a balanced cost and bandwidth-sensitive mode of operation;
    a balanced coverage and bandwidth-sensitive mode of operation; and
    a balanced coverage, cost, and bandwidth mode of operation;

the method further comprising:

determining 1st through Nth combinations of (1) telecommunications carriers, (2) telecommunication carrier plans, and (3) telecommunication carrier networks;

selecting the balanced coverage and bandwidth-sensitive mode of operation;

generating a plurality of averages, each average corresponding to an average of a coverage grade and a bandwidth grade for one of the 1st through Nth combinations;

comparing the plurality of averages associated with the 1st through Nth combinations to each other; and selecting one combination from among the 1st through Nth combinations having an average that is superior to the averages associated with the other combinations from among the 1st through Nth combinations.

13. A method for algorithmically balancing cost and performance of cellular data connections, the method comprising:

determining a preferred mode of operation;

receiving, from one or more mobile cellular devices, a plurality of cellular operational characteristics;

algorithmically balancing cost and performance of the cellular data connections of the one or more mobile cellular devices based on the preferred mode of operation and the received cellular operational characteristics;

wherein determining the preferred mode of operation includes:
  selecting a mode of operation from among a plurality of modes of operation,
  wherein the plurality of modes of operation include:
    a coverage-sensitive mode of operation, a cost-sensitive mode of operation, and a bandwidth-sensitive mode of operation;
  wherein the plurality of modes of operation further include:
    a balanced coverage and cost-sensitive mode of operation;
    a balanced cost and bandwidth-sensitive mode of operation;
    a balanced coverage and bandwidth-sensitive mode of operation; and
    a balanced coverage, cost, and bandwidth mode of operation;

the method further comprising:

determining 1st through Nth combinations of (1) telecommunications carriers, (2) telecommunication carrier plans, and (3) telecommunication carrier networks;

selecting the balanced coverage, cost, and bandwidth-sensitive mode of operation;

generating a plurality of averages, each average corresponding to an average of a coverage grade, a cost grade, and a bandwidth grade for one of the 1st through Nth combinations;

comparing the plurality of averages associated with the 1st through Nth combinations to each other; and selecting one combination from among the 1st through Nth combinations having an average that is superior to the averages associated with the other combinations from among the 1st through Nth combinations.

14. The method of claim 1, wherein:
the plurality of cellular operational characteristics includes traffic information, signal strength information, signal quality information, network type information, network service type information, network reliability information, bandwidth usage information, and location coordinates; and
receiving further includes receiving, by a remote server, from the one or more mobile cellular devices, the traffic information, the signal strength information, the signal quality information, the network type information, the network service type information, the network reliability information, the bandwidth usage information, and the location coordinates.

15. The method of claim 1, further comprising:
periodically transmitting one or more rules, to the one or more mobile cellular devices, based on the preferred mode of operation and the received cellular operational characteristics.

16. The method of claim 1, further comprising:
managing a pool of telecommunications carrier plans from among one or more telecommunications carriers;
automatically selecting a plan from among the pool of plans according to predefined criteria; and
transmitting a rule to the one or more mobile cellular devices instructing the one or more mobile cellular devices to obtain cellular access through the selected plan.

17. The method of claim 1, further comprising:
receiving, from one or more telecommunications carriers, spot prices corresponding to a current price associated with accessing a particular cellular network; and
wherein algorithmically balancing cost and performance of the cellular data connections of the one or more mobile cellular devices is further based on the received spot prices.

18. A non-transitory computer-readable medium carrying instructions thereon to process, with a computing device, logic for algorithmically balancing cost and performance of cellular data connections, the instructions comprising:
instructions for determining a preferred mode of operation;
instructions for receiving, from one or more mobile cellular devices, a plurality of cellular operational characteristics;
instructions for algorithmically balancing cost and performance of the cellular data connections of the one or more mobile cellular devices based on the preferred mode of operation and the received cellular operational characteristics;
instructions for detecting, by a remote server, that the one or more mobile cellular devices is nearing an end of a billing cycle; and
instructions for transmitting an instruction to the one or more mobile cellular devices to temporarily disable access to any cellular network until the beginning of a next billing cycle.

19. The non-transitory computer-readable medium of claim 18, wherein the instructions for determining the preferred mode of operation further comprise:
instructions for selecting a mode of operation from among a plurality of modes of operation, wherein the plurality of modes of operation include:
a coverage-sensitive mode of operation, a cost-sensitive mode of operation, and a bandwidth-sensitive mode of operation.

* * * * *